United States Patent
Gutshall

[15] 3,665,801
[45] May 30, 1972

[54] DRILL SCREW

[72] Inventor: Charles E. Gutshall, Ellwood City, Pa.
[73] Assignee: Textron, Inc., Providence, R.I.
[22] Filed: Aug. 25, 1970
[21] Appl. No.: 66,795

[52] U.S. Cl. ................................................85/41, 408/230
[51] Int. Cl. .........................................F16b 25/00, F16b 35/00
[58] Field of Search............................85/41, 47, 48, 46, 68;
408/230, 226, 210, 227–229, 233; 10/152 T, 152 R, 10 R

[56] References Cited

UNITED STATES PATENTS

| | | | |
|---|---|---|---|
| 1,698,951 | 1/1929 | Holmes | 85/41 UX |
| 3,358,548 | 12/1967 | Dyslin | 85/47 |
| 470,804 | 3/1892 | Jones | 85/48 |
| 1,342,201 | 6/1920 | Beckwith | 85/68 |
| 3,094,894 | 6/1963 | Broberg | 85/47 |
| 3,395,603 | 8/1968 | Skierski | 85/47 |
| 3,463,045 | 8/1969 | Prescott | 85/41 |

FOREIGN PATENTS OR APPLICATIONS 696,358  10/1964   Canada.....................................85/41

*Primary Examiner*—Ramon S. Britts
*Attorney*—Webb, Burden, Robinson & Webb

[57] ABSTRACT

The drill screw comprises a drill tip, a threaded shank and a head. The drill tip is in two sections, the first of which is a pyramidal shaped entry section, and the second of which is a trailing section having a diameter less than the major diameter of the first section. The major diameter of the entry section is generally larger than or equal to the pitch diameter of the threaded section or where the major diameter of the entry section is smaller than the pitch diameter of the threads, a convolutely fluted section having a major diameter greater than the major diameter of the entry section but less than the major diameter of the threads is positioned adjacent the trailing section of the drill tip and intermediate the drill tip and the threads.

5 Claims, 3 Drawing Figures

Patented May 30, 1972

3,665,801

INVENTOR.
Charles E. Gutshall

BY Webb Burden Robinson
& Webb
HIS ATTORNEYS

DRILL SCREW

This disclosure relates to fasteners and, more particularly, to the drill screw type of fastener.

A common problem to the fastener manufacturer is the continual demand for improved drill screws that increase the capacity of the screw to drill heavy materials, drill thicker compositions or laminates, or to provide extruded holes in thin metals for increased clamping. Heretofore, various drill screws have been devised which, among other things, include drill points cut from a straight blank equal to the pitch diameter of the threads, increased thread cutting slots in the drill point to facilitate thread cutting, and drill points positioned on shanks which have threaded portions separated by nonthreaded portions and which decrease in diameter moving downwardly from the head of the fastener.

My invention increases the capacity of the drill screw to drill heavy materials while at the same time providing additional chip removal clearances to accomplish the same. Further, in a particular embodiment of my invention a very thin section of metal can be self-tapped by my drill screw to provide a substantially increased cross-section for threading over the original thickness of the metal section. Further, because of the efficiency of my drill screws, extra slotting in the drill point and other costly manufacturing steps can be eliminated. Because of the simplicity of my design, my drill screws can accommodate wide ranges of driving torques since torque setting is not as critical as for the more complex designs.

My invention provides a drill screw having a drill tip which is in two sections. The first section, which is the entry section, is somewhat pyramidal shaped and the second section, which is substantially cylindrical, extends therefrom the connects to the threads. The diameter of the trailing section is smaller than the major diameter of the entry section and in a preferred embodiment a convolutely fluted section having a diameter greater than the major diameter of the entry section but smaller than the major diameter of the threads is positioned intermediate the threads and the drill tip section.

In the accompanying drawings, I have shown one preferred embodiment of my invention in which.

Figure 1:
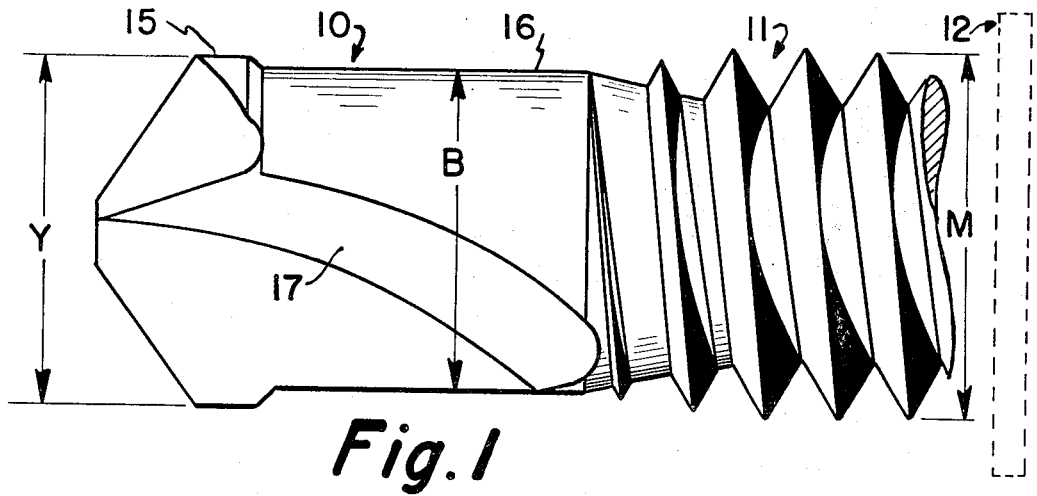
FIG. 1 is an elevation of my drill screw.

My invention in its simplest form, is shown in FIG. 1, where a drill screw is shown having a drill tip generally designated 10, a threaded shank generally designated 11, and a head depicted by dotted lines and generally designated 12. The head 12 can be of a wide variety of types known in the art and the particular design is not critical, nor does the particular design of the head form a part of my invention.

The drill tip 10 comprises two sections, the first being the entry section 15, and the second being trailing section 16. The entry section 15 is generally pyramidal shaped, whereas the trailing section 16 is cylindrical. A helical drilling groove 17 extends from at or near the forward end of the entry section 15 substantially or at least partially along the length of trailing section 16.

The criticality in the sizing of the drill tip 10 is that the diameter of the trailing section 16, designated B, is smaller than the major diameter (point diameter) of the entry section 15, designated as Y. This then permits a substantial amount of chip removal clearance when the drill screw is inserted into a workpiece.

Figure 2:
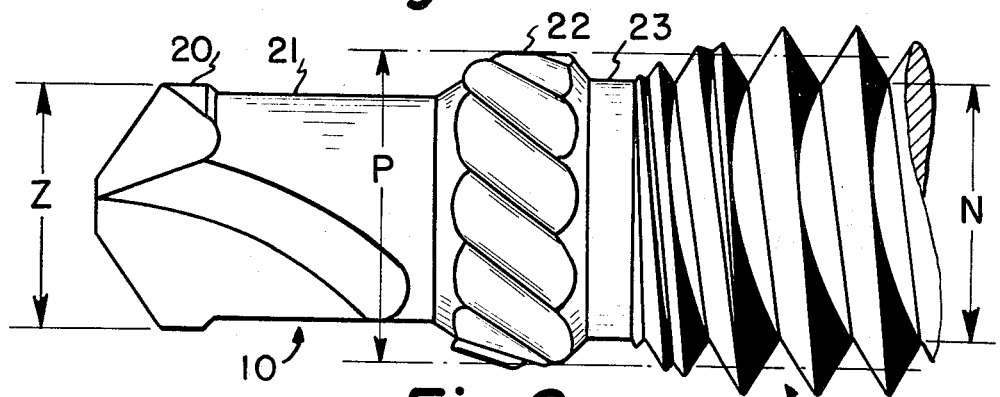
FIG. 2 is an elevation of another embodiment of my drill screw including an intermediate convolutely fluted section.

In the embodiment of FIG. 1, the trailing section 16 of the drill tip 10 connects to the threaded shank 11. The major diameter Y of the entry section is at least equal to the pitch diameter of the threads, and as shown in FIG. 1, can be as large as the major diameter designated M of the threads.

Where a very thin metal is being self-tapped by a drill screw, the embodiment of FIG. 2 is preferred. In this embodiment, the drill tip has an entry section 20 having a major diameter designated Z greater than the diameter of the trailing section 21 as in the earlier embodiment. Here, however, a convolutely fluted section 22 is positioned adjacent the trailing section 21 and intermediate the trailing section 21 and the threaded shank 11. The convolutely fluted section 22 can also take the form of actual threads or knurls.

The major diameter Z of the entry section 20, is less than the minor diameter (root diameter) of the threads, designated N. The major diameter of the convolutely fluted section 22, designated P, is between the minor and major thread diameters and, therefore, is larger than the major diameter Z of entry section 20. The convolutely fluted section 22 extends into a cylindrical portion 23 less than and connecting with the minor diameter N of the threaded shank 11.

The drill screw of FIG. 2 works as follows when inserted by a driving tool. The hole drilled by the major diameter Z of the entry tip 20 is less than the minor diameter N of the threads. Because the trailing section 21 has a smaller diameter, when the entry end 20 passes through the workpiece the axial force of the driving tool forces the convolutely fluted section 22 into the newly formed opening at the same time that it is spinning with the result that convolutely fluted section 22 actually extrudes the opening, that is, it thickens the workpiece and then, because of the convolutes, draws itself through. Then because of the short trailing section 23 of the convolutely fluted section 22, there is another momentary void in terms of contact with the opening and then the threaded shank portion 11 begins to tap the ultimate hole. The convolutely fluted section 22 actually causes a "rifle type bore" in the workpiece and thereby permits easier starting of the ultimate threads of threaded shank 11.

Figure 3:
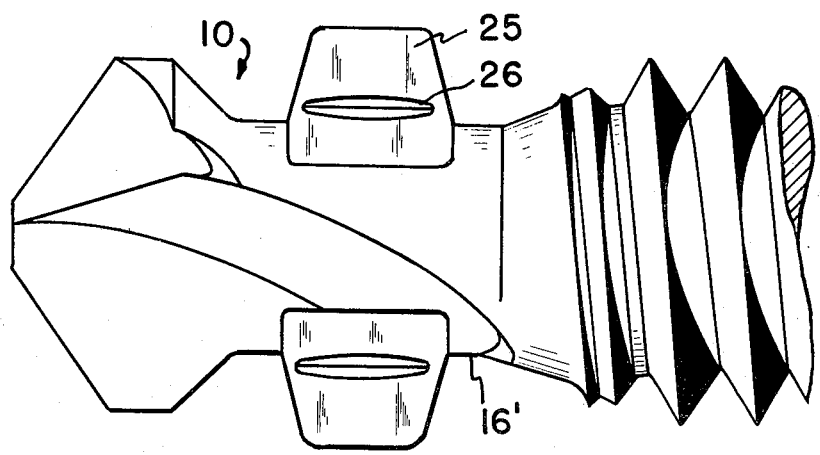
FIG. 3 is an elevation of still a further embodiment of my invention including wing tips.

Standard wing tips, as shown in FIG. 3, can also be employed with my invention where, for example, a wood-metal laminate is connected. The wing tip 25, which is actually comprised of two opposed tips, is positioned on the trailing end portion 16' of the drill tip 10. Wing tip 25 has a standard groove 26 depressed therein to permit the outwardly extending portion thereof to break off after insertion through a first layer of workpiece.

While I have shown and described preferred embodiments of my invention, it may be otherwise embodied within the scope of the appended claims.

I claim:

1. A drill screw comprising a drill tip, a shank with threads and a head, said drill tip having a substantially pyramidal entry section terminating in a generally cylindrical portion with a major diameter at least equal to the pitch diameter of the threads, and a trailing section adjacent the generally cylindrical portion of the entry section and having a diameter less than the major diameter of the entry section, said drill tip having a helical drilling means extending substantially throughout the axial extent of the entry and trailing sections, said threaded shank extending from the trailing section and terminating in the head.

2. The drill screw of claim 1 wherein the major diameter of the pyramidal entry section is substantially equal to the major diameter of the threads.

3. The drill screw of claim 1 wherein the trailing section contains two mutually opposed and outwardly extending wing tips adaptable to have the end portions thereof break off from the remaining balance.

4. A drill screw comprising a drill tip, a shank with threads terminating in a head and a convolutely fluted section intermediate the shank and drill tip, said drill tip having a substantially pyramidal entry section with a major diameter less than the minor diameter of the threads, a trailing section having a diameter less than the major diameter of the entry section and a helical drilling means extending along the entry and trailing sections, said convolutely fluted section having a major diameter greater than the major diameter of the entry section but less than the major diameter of the threads.

5. The drill screw of claim 4 wherein the convolutely fluted section terminates in a cylindrical shaft connecting to the threaded shaft and being of smaller diameter than the major diameter of the convolutely fluted section and less than the minor diameter of the threads.

* * * * *